（12）United States Patent
Muffley et al.

(10) Patent No.: US 11,073,186 B2
(45) Date of Patent: Jul. 27, 2021

(54) BRAKE PAD BACKING PLATE

(71) Applicant: Tenneco Inc., Lake Forest, IL (US)

(72) Inventors: David Douglas Muffley, Clear Spring, MD (US); Gregory Michael Vyletel, Ann Arbor, MI (US); Warran Boyd Lineton, Chelsea, MI (US)

(73) Assignee: TENNECO INC., Lake Forest, IL (US)

( * ) Notice: Subject to any disclaimer, the term of this patent is extended or adjusted under 35 U.S.C. 154(b) by 14 days.

(21) Appl. No.: 16/414,357

(22) Filed: May 16, 2019

(65) Prior Publication Data

US 2019/0353215 A1 Nov. 21, 2019

Related U.S. Application Data

(60) Provisional application No. 62/672,323, filed on May 16, 2018.

(51) Int. Cl.
*F16D 65/095* (2006.01)
*F16D 65/092* (2006.01)
(Continued)

(52) U.S. Cl.
CPC ......... *F16D 65/095* (2013.01); *F16D 65/092* (2013.01); *F16D 69/0408* (2013.01); *C23C 4/11* (2016.01); *C23C 4/129* (2016.01); *F16D 2069/0466* (2013.01); *F16D 2200/0021* (2013.01); *F16D 2200/0039* (2013.01); *F16D 2250/0046* (2013.01); *F16D 2250/0069* (2013.01)

(58) Field of Classification Search
CPC .. F16D 65/095; F16D 65/092; F16D 69/0408; F16D 2069/0466; F16D 2200/0039; F16D 2250/0046; F16D 2250/0069; C23C 4/11; C23C 4/129
See application file for complete search history.

(56) References Cited

U.S. PATENT DOCUMENTS 5,305,726 A 4/1994 Scharman et al.
5,612,110 A 3/1997 Watremez
(Continued)

FOREIGN PATENT DOCUMENTS

CN 205978208 U 2/2017
DE 10316369 A1 * 7/2004 ............. F16D 69/04
(Continued)

OTHER PUBLICATIONS

International Search Report and Written Opinion issued for PCT/US2019/032678 dated Aug. 29, 2019.

*Primary Examiner* — Melanie Torres Williams
(74) *Attorney, Agent, or Firm* — Reising Ethington, P.C.

(57) ABSTRACT

A coated backing plate for a brake pad and method of manufacturing a brake pad having a coated backing plate, where the coating for the backing plate includes a bond layer. The bond layer includes an inboard surface, an outboard surface, a closed pore network toward the outboard surface that faces the inboard surface of the reinforcement plate, and an open pore network at the inboard surface of the bond layer. The open pore network includes a recessed topology having a plurality of craters configured to interlock a friction material of a friction pad or one or more intermediate layers, such as a transition layer and/or a thermal barrier layer.

17 Claims, 5 Drawing Sheets

(51) Int. Cl.
*F16D 69/04* (2006.01)
*C23C 4/11* (2016.01)
*C23C 4/129* (2016.01)

(56) References Cited

U.S. PATENT DOCUMENTS

| | | | |
|---|---|---|---|
| 6,651,795 B2 | 11/2003 | Ellis et al. | |
| 7,261,192 B2 | 8/2007 | Khambekar et al. | |
| 7,490,704 B2 | 2/2009 | Hara et al. | |
| 7,553,563 B2 | 6/2009 | Grau et al. | |
| 8,084,089 B2 | 12/2011 | Meckel | |
| 8,147,912 B2 | 4/2012 | Golleb et al. | |
| 8,449,943 B2 | 5/2013 | Meckel | |
| 8,813,921 B2 | 8/2014 | Iwai et al. | |
| 8,895,133 B2 | 11/2014 | Nesbitt | |
| 8,978,842 B2 | 3/2015 | Iwai et al. | |
| 9,016,443 B2 | 4/2015 | Zhang et al. | |
| 9,360,067 B1 * | 6/2016 | Arbesman | F16D 65/092 |
| 9,458,894 B2 | 10/2016 | Stefanutti et al. | |
| 9,638,276 B2 | 5/2017 | Schluck et al. | |
| 9,683,613 B2 | 6/2017 | Stefanutti | |
| 9,752,632 B2 | 9/2017 | Ernst et al. | |
| 9,829,057 B2 | 11/2017 | Chung et al. | |
| 9,879,740 B2 | 1/2018 | Tironi et al. | |
| 9,933,031 B2 | 4/2018 | Bracamonte et al. | |
| 10,001,181 B2 | 6/2018 | Broda et al. | |
| 10,012,279 B2 | 7/2018 | Wall et al. | |
| 10,100,890 B2 | 10/2018 | Bracamonte et al. | |
| 10,107,344 B2 | 10/2018 | Bracamonte et al. | |
| 10,113,600 B2 | 10/2018 | Bracamonte et al. | |
| 10,151,363 B2 | 12/2018 | Bracamonte et al. | |
| 10,197,121 B2 | 2/2019 | Filip et al. | |
| 2003/0057038 A1 | 3/2003 | Kesavan et al. | |
| 2007/0068750 A1 | 3/2007 | Hara et al. | |
| 2009/0317642 A1 | 12/2009 | Goller et al. | |
| 2014/0209422 A1 * | 7/2014 | Takayama | C23C 8/26 188/251 M |
| 2015/0041262 A1 | 2/2015 | Meckel | |
| 2016/0017944 A1 | 1/2016 | Meckel | |
| 2016/0046531 A1 * | 2/2016 | Izumi | B23K 35/325 428/116 |
| 2016/0108981 A1 | 4/2016 | Meckel | |
| 2016/0215839 A1 | 7/2016 | Bruggen et al. | |
| 2016/0223041 A1 | 8/2016 | Saga et al. | |
| 2016/0273601 A1 | 9/2016 | Broda et al. | |
| 2016/0333949 A1 | 11/2016 | Nagai et al. | |
| 2017/0145914 A1 | 5/2017 | Lineton et al. | |
| 2017/0175834 A1 | 6/2017 | Bracamonte et al. | |
| 2017/0204920 A1 * | 7/2017 | Poirier | C23C 4/08 |
| 2018/0216524 A1 * | 8/2018 | Lineton | C23C 28/32 |
| 2019/0003539 A1 | 1/2019 | Bracamonte et al. | |
| 2019/0277359 A1 * | 9/2019 | Farah Ati | F16D 69/026 |
| 2019/0301000 A1 * | 10/2019 | Jordan | C23C 4/11 |

FOREIGN PATENT DOCUMENTS

| | | |
|---|---|---|
| DE | 102007020891 A1 | 11/2008 |
| EP | 0084591 A1 | 8/1983 |
| EP | 1106859 A1 | 6/2001 |
| EP | 1621792 B1 | 2/2006 |

* cited by examiner

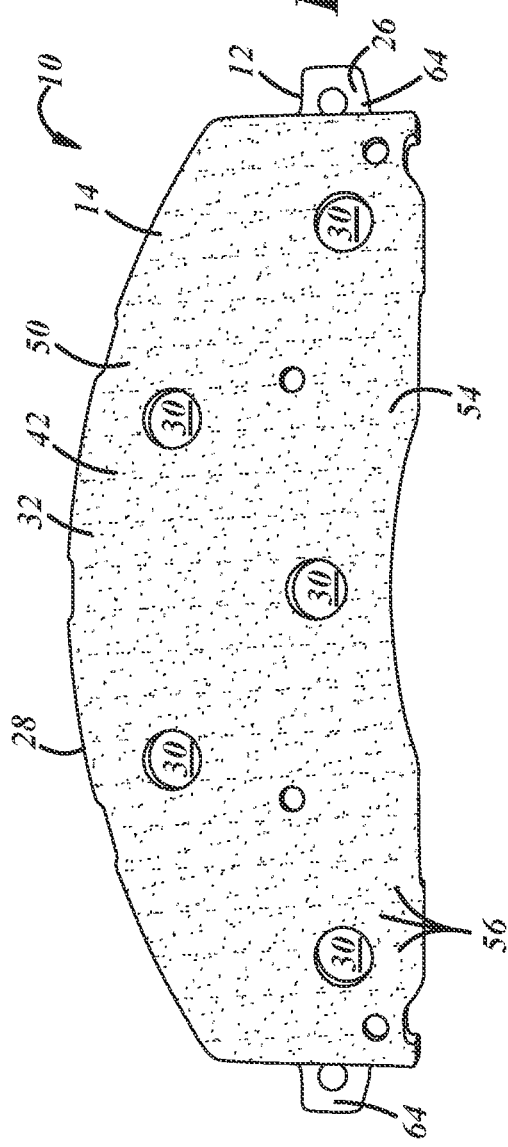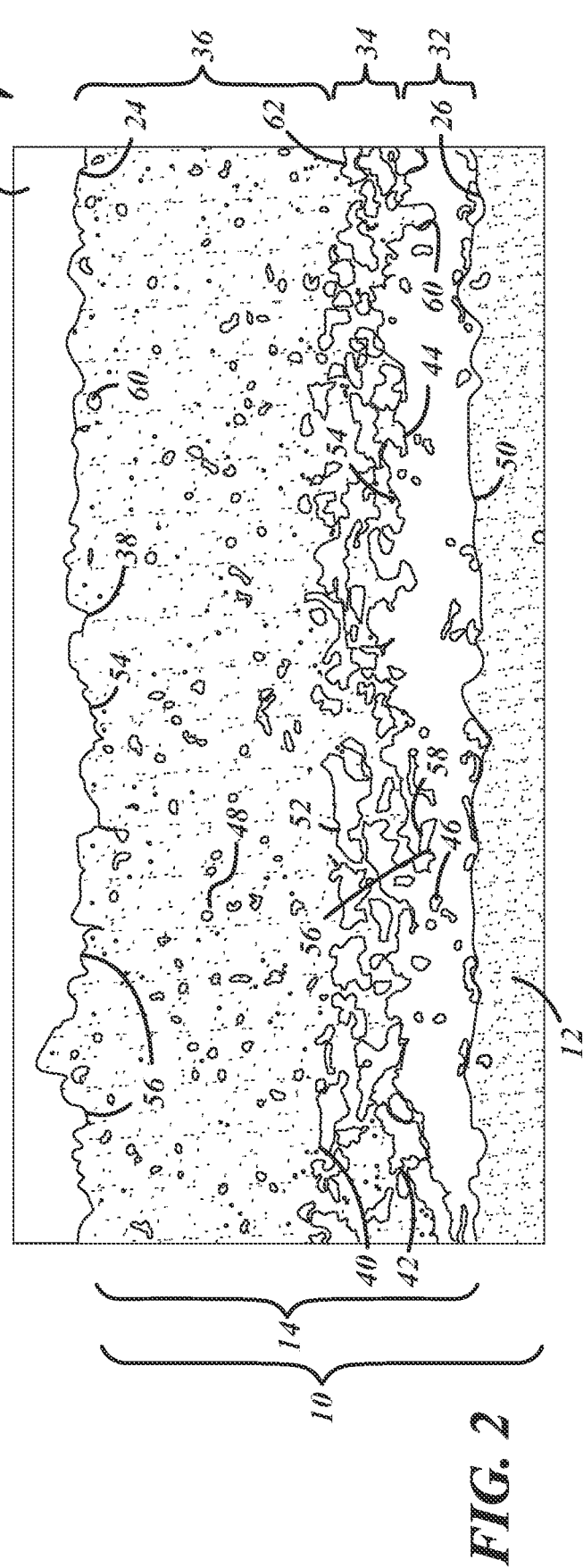

BRAKE PAD BACKING PLATE

CROSS-REFERENCE TO RELATED APPLICATION

This application claims priority to U.S. Provisional Application Ser. No. 62/672,323, filed on May 16, 2018, the contents of which are hereby incorporated by reference in their entirety.

TECHNICAL FIELD

This invention generally relates to automotive brakes and, in particular, to backing plates for automotive brake pads.

BACKGROUND

Brake pads are used in a variety of vehicles of varying size, including motorcycles, automobiles, and trucks, and generally include a backing plate and a friction pad attached to the backing plate. Promoting attachment of the friction pad to the backing plate can help improve brake pad life. Raised features or prominences on the backing plate may be used to promote attachment by mechanically interlocking the friction pad, but in some instances, the raised features or prominences may decrease the usable amount of friction material as contact between the raised features or prominences and the rotor can be undesirable.

Furthermore, temperature regulation of the brake pad can help improve pad life and/or reduce the risk of brake system failure. High temperatures in excess of 700° C. can be generated when a brake pad contacts a rotor under hard braking conditions. This may be problematic if significant heat flows from the friction pad, through the backing plate, and into the caliper assembly. Under extreme braking, such as in racing or during long mountain descents, there is a risk of boiling brake fluid and component failure. Reducing heat flow through the backing plate may accordingly be desirable.

SUMMARY

According to one embodiment, there is provided a coated backing plate and a brake pad, the coated backing plate comprising: a reinforcement plate having an outboard surface and an inboard surface; and a bond layer having an inboard surface, an outboard surface, a closed pore network toward the outboard surface that faces the inboard surface of the reinforcement plate, and an open pore network at the inboard surface of the bond layer, wherein the open pore network includes a recessed topology having a plurality of craters configured to interlock a friction material of a friction pad or one or more intermediate layers.

According to various other embodiments, the coated backing plate may include any of the following features, or any combination of the following features:
the open pore network and the closed pore network create a pore space geometry having an architecture, wherein the architecture of the pore space geometry is influenced by a parameter in a thermal spray process;
a tortuosity of the open pore network defines a sinuosity and an interconnectedness of the pore space geometry;
one or more craters of the plurality of craters includes a tortuous side wall;
the tortuous side wall includes two or more separate undercuts, each undercut having an area that generally opposes the inboard surface of the reinforcement plate;
the bond layer includes hollow sphere particles, spray dried particles, sintered particles, sol-gel particles, fused particles, crushed particles, or a combination thereof;
the one or more intermediate layers includes a thermal barrier layer, and wherein the thermal barrier layer has an open pore network configured to interlock the friction material;
the one or more intermediate layers includes a transition layer between the bond layer and the thermal barrier layer, wherein the bond layer, the transition layer, and the thermal barrier layer together comprise a thermal barrier coating;
the thermal barrier coating has a porosity by volume between 5% and 25%, inclusive;
the transition layer and the thermal barrier layer include a ceramic material with a thermal conductivity that is less than 1 W/mk;
the thermal barrier coating has a gradient structure that transitions from 100% of a metal bond material for the bond layer to 100% of a ceramic material for the thermal barrier layer; and/or
10% to 90%, inclusive, of a thickness of the thermal barrier coating is formed of the bond layer, up to 80% of the thickness of the thermal barrier coating is formed of the gradient structure, and 10% to 90%, inclusive, of the thickness of the thermal barrier coating is formed of the thermal barrier layer.

According to another embodiment, there is provided a coated backing plate and a brake pad, wherein the coated backing plate comprises: a reinforcement plate having an outboard surface and an inboard surface; and a bond layer having an inboard surface and an outboard surface, wherein the inboard surface of the bond layer includes a plurality of craters configured to interlock friction material of a friction pad or one or more intermediate layers, wherein one or more craters of the plurality of craters includes a tortuous side wall, wherein the tortuous side wall includes two or more separate undercuts, each undercut having an area that generally opposes the inboard surface of the reinforcement plate.

According to another embodiment, there is provided a method of manufacturing a brake pad, comprising the steps of: preparing a reinforcement plate, the reinforcement plate having an inboard surface and an outboard surface; forming a coated backing plate by applying a bond layer to the inboard surface of the reinforcement plate; and pressing a friction pad to the coated backing plate such that a friction material of the friction pad interlocks with an open pore network of the coated backing plate.

According to various other embodiments, the method may include any of the following features or steps, or any combination of the following features or steps:
wherein the open pore network includes a recessed topology having a plurality of craters configured to interlock the friction material of the friction pad;
the bond layer is applied by high velocity oxy-fuel (HVOF) spraying;
adjusting a velocity of an arc spray plume to generate larger metal droplets to collide while in flight to the inboard surface of the reinforcement plate; and/or
plasma spraying a gradient structure and a thermal barrier layer on the bond layer.

BRIEF DESCRIPTION OF THE DRAWINGS

Preferred exemplary embodiments will hereinafter be described in conjunction with the appended drawings, wherein like designations denote like elements, and wherein:

FIG. 1 shows a coated backing plate according to one embodiment;

FIG. 2 is a cross-section micrograph of a brake pad according to one embodiment;

DESCRIPTION

Figure 3:
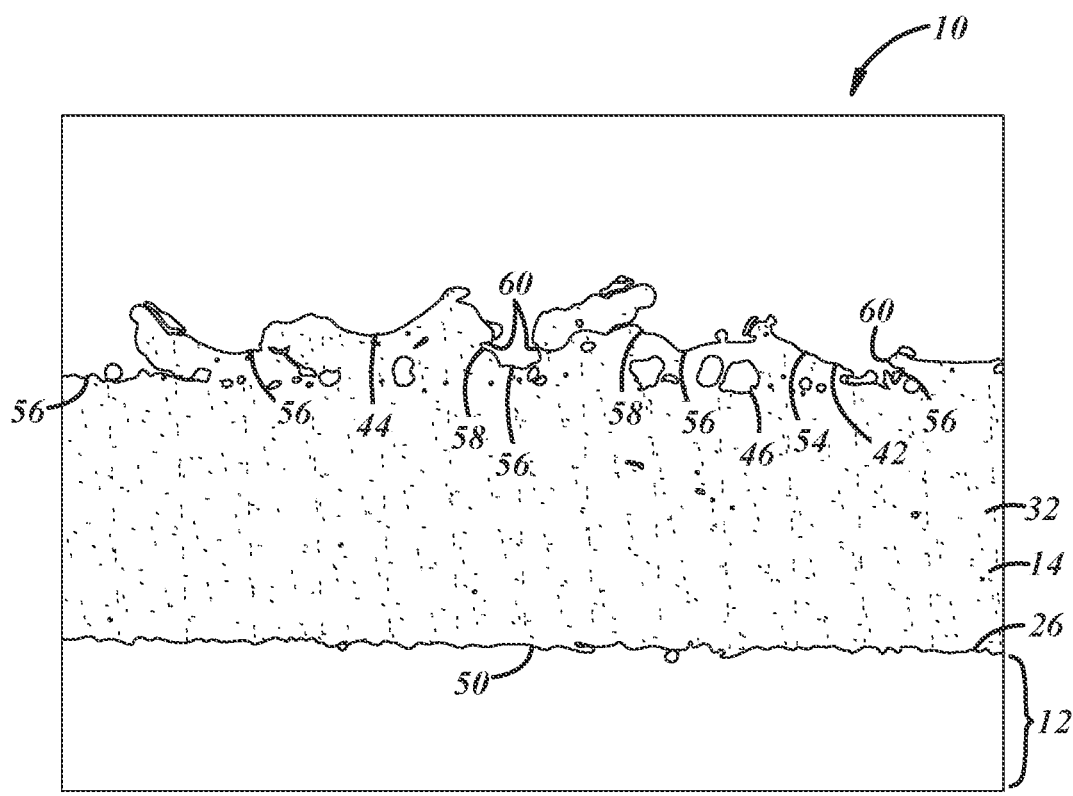
FIGS. 3-8 are cross-section micrographs of a bond layer according to various embodiments.
Figure 4:
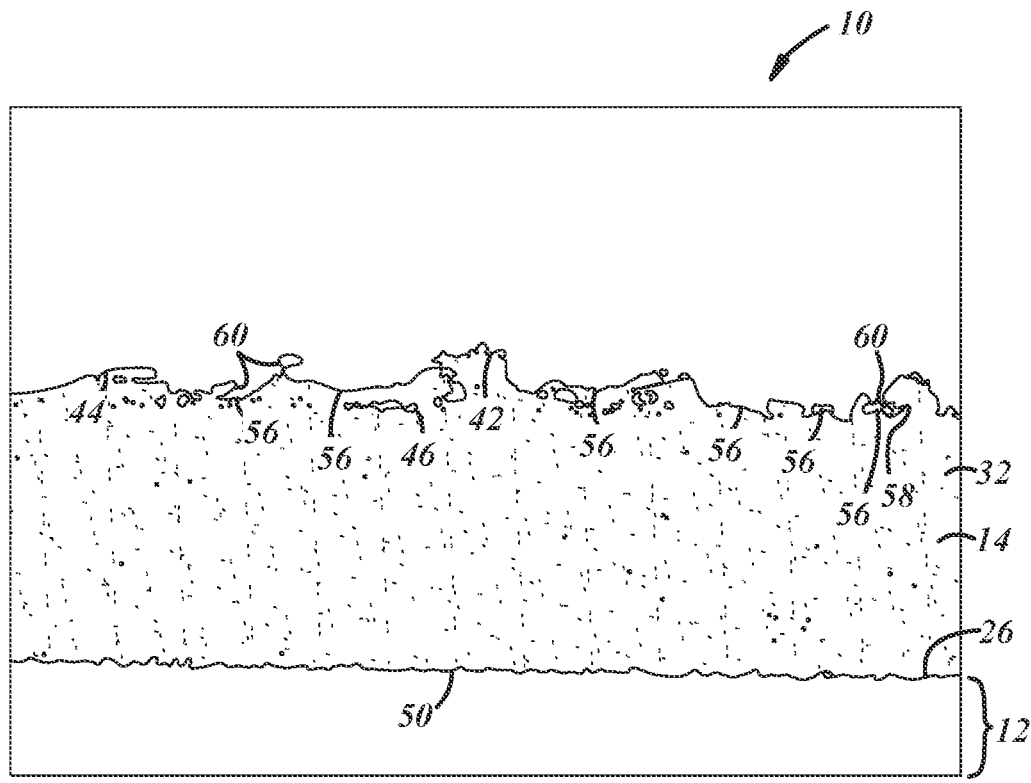
Figure 5:
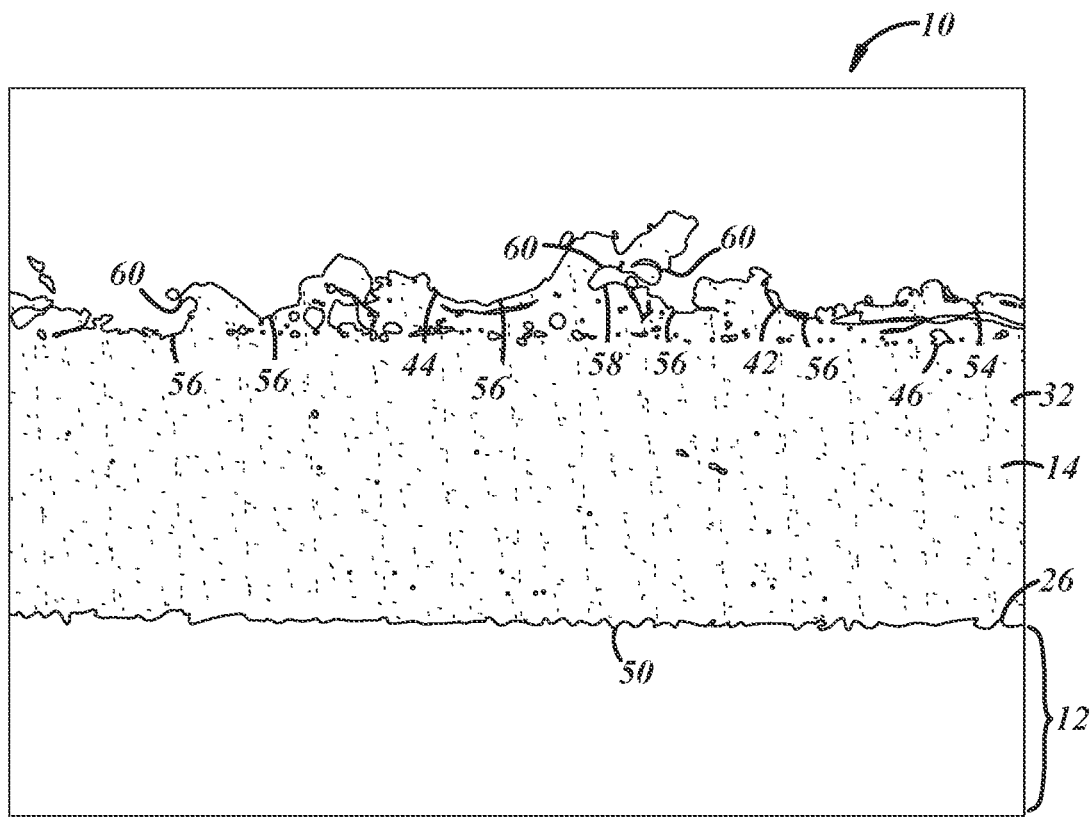
Figure 6:
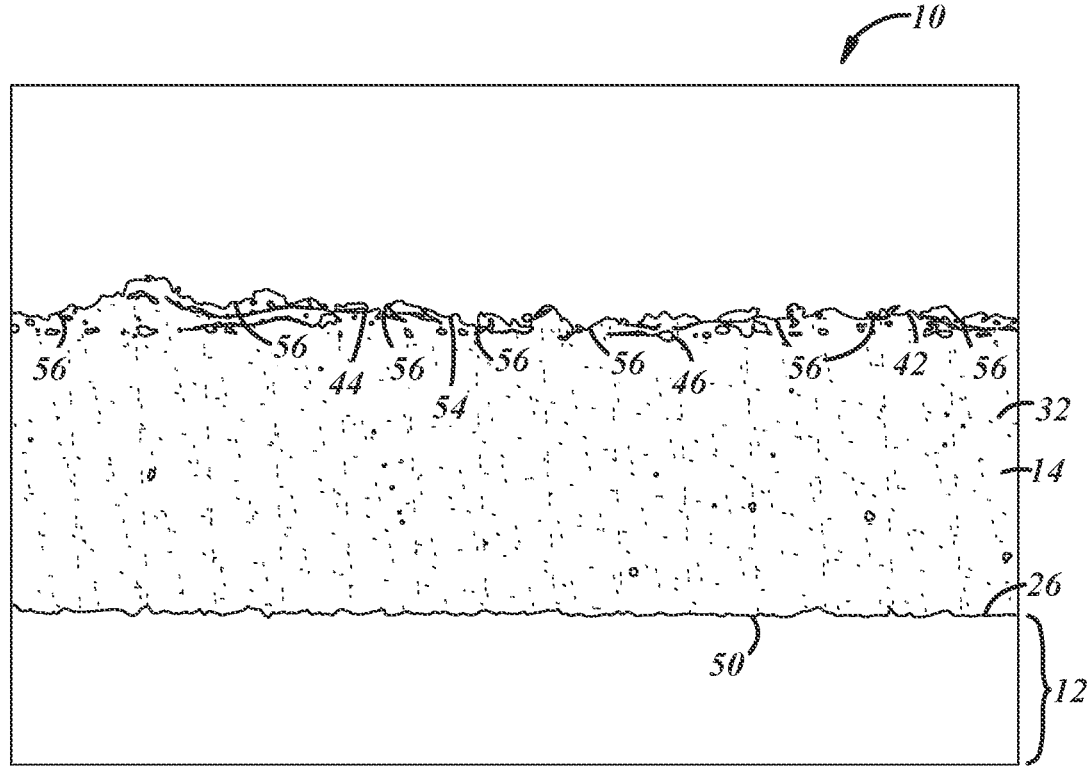
Figure 7:
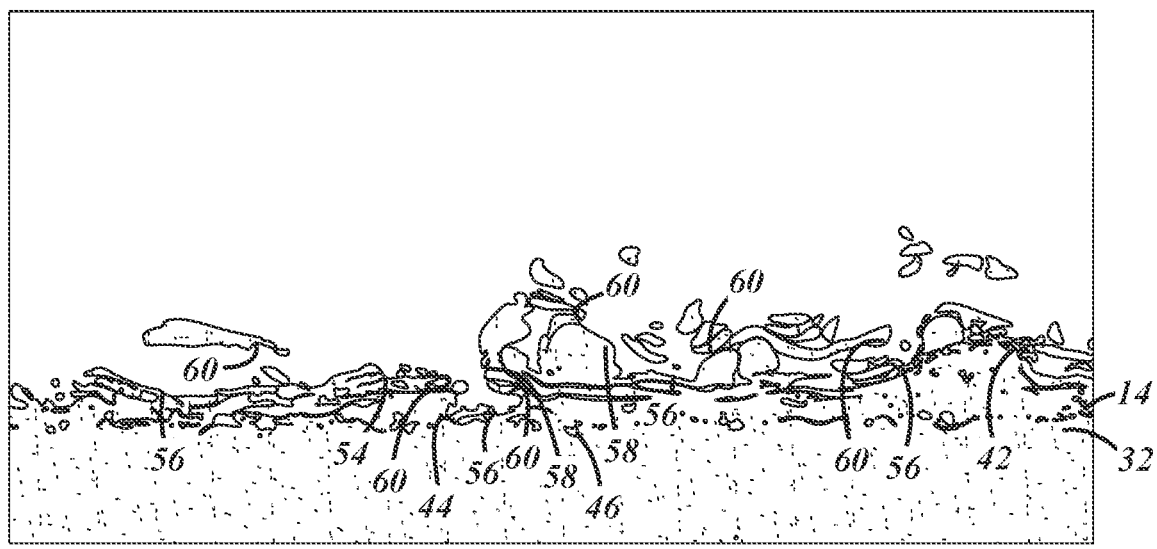
Figure 8:
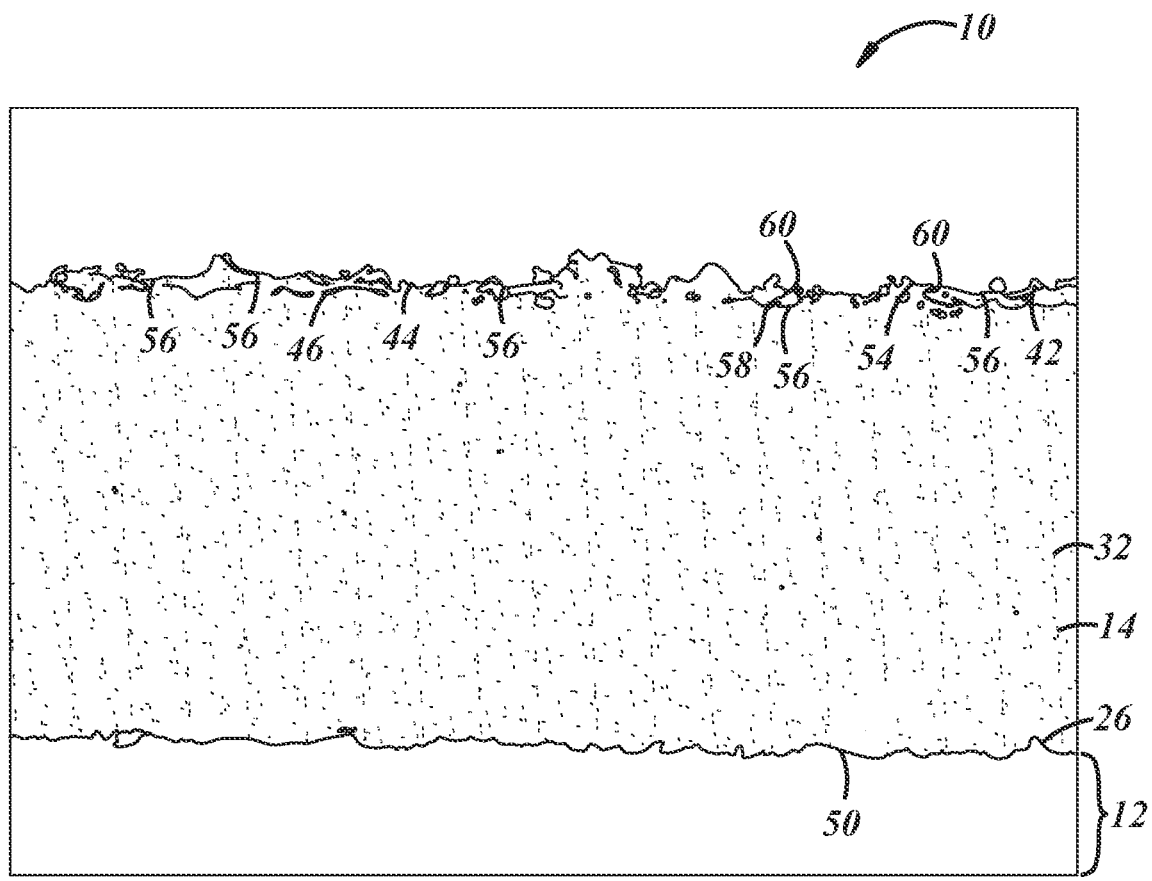

The coated backing plate embodiments disclosed herein may be used in various brake pad designs and in various vehicle applications to help improve attachment of the friction pad. The backing plate embodiments are coated, some embodiments having a multi-layered coating, to promote shear retention between the various layers. The backing plate generally includes a coated reinforcement plate, with the coating including a bond layer and/or a thermal barrier layer. Either or both of the bond layer and the thermal barrier layer may be thermally sprayed to help create various features such as an open pore network at an inboard surface configured to mechanically interlock friction material of the friction pad.

FIG. 1 shows a coated backing plate 10. The illustrated backing plate 10 configuration is just an example, as other geometries, features, etc., may be possible depending on factors such as the caliper design. The coated backing plate 10 in the illustrated embodiment includes a reinforcement plate 12 and a coating 14 that is situated between the reinforcement plate 12 and a friction pad. As will be detailed further below, the coating 14 of backing plate 12 includes a number of features to help promote adhesion or attachment of the various components of the brake pad to thereby improve the life and performance of the brake pad.

An example cross-section of a brake pad 20 is shown in FIG. 2. This example includes the reinforcement plate 12, one embodiment of a coating 14, and a friction pad 22 (a portion of which is illustrated). In use, the friction pad 22 interacts with a braking surface such as a rotor (not shown) to inhibit rotational motion and stop the vehicle. A rotor is used as an example herein to positionally describe one or more features of the brake pad 20. Accordingly, directional terms such as inboard and outboard may be used to describe whether a component faces toward a rotor (e.g., inboard) or away from a rotor (e.g., outboard) when the brake pad 20 is installed. The friction pad 22 includes an inboard-facing friction surface and an outboard-facing attachment surface 24. The friction surface may include features that are not illustrated, such as chamfers, slots, curved edges, wear sensors or indicators, etc. The attachment surface 24 directly opposes or faces the coating 14 of the backing plate 10, although other layers such as an adhesive layer or the like may be included. The friction pad 22 may be made from any operable material, such as a non-asbestos organic (NAO) material, a ceramic material, or a semi-metallic material (e.g., about 30-65 wt % metal).

Typically, the friction pad 22 is directly (or indirectly via an adhesive layer) bonded to a steel backing plate or reinforcement plate 12. However, in accordance with the presently described brake pad 10, one or more layers of a coating 14 may be included between the reinforcement plate 12 and the friction pad 22. The reinforcement plate 12 is typically a steel plate, the configuration of which is dictated by the needs of the braking system or caliper design. Accordingly, other features, shapes, materials, etc. besides those illustrated and described may be employed for the reinforcement plate 12, such as additional caliper attachment projections, eye holes, etc., to cite a few examples. The reinforcement plate 12 has an inboard surface 26, an outboard surface, and an outer perimeter 28. The reinforcement plate 12 may also include one or more mold holes 30 to help lock the friction pad 22 to the reinforcement plate.

Embodiments of the brake pad 20 include a reinforcement plate 12 that has a coating 14 to form the coated backing plate 10. In the embodiment illustrated in FIG. 2, the coating 14 includes a bond layer 32, a transition layer 34, and a thermal barrier layer 36. As will be detailed further, some embodiments may only include the bond layer 32 without any intermediate layers such as the transition layer 34 and the thermal barrier layer 36. In this embodiment, the thermal barrier layer 36 includes a pore network 38 that is situated at an inboard surface 40 to help mechanically interlock the outboard facing attachment surface 24 of the friction pad 22. The bond layer 32 also includes a pore network 42 situated at its inboard surface 44 which can help interlock the transition layer 34 and/or the thermal barrier layer 36, or in embodiments without one or more intermediate layers, the pore network 42 of the bond layer 32 helps mechanically interlock the outboard facing attachment surface 24 of the friction pad 22. In most embodiments, the thickness of the bond layer 32 will be about 50 micron to 2 mm, depending on the application method (e.g., thermal spray parameters) and performance requirements, and the thickness of the thermal barrier layer 36 will be about 50 micron to 500 micron, again depending on the application method and performance requirements. If the thermal barrier layer 36 is ceramic, making the thermal barrier layer thicker than 500 micron could result in crack failure or delamination, in some embodiments.

FIGS. 3-8 are cross-section micrographs of the bond layer 32 according to various embodiments. Many features of the bond layer 32 are discussed with reference to FIGS. 3-8, including most particularly, the open pore network 42, and these features may also be included on or with similar features of the thermal barrier layer 36, such as the open pore surface network 38 shown in FIG. 2. Another example feature that may be similar between both the bond layer 32 and the thermal barrier layer 36 is a closed pore network 46, 48. The closed pore network 46 of the bond layer 32 is located toward an outboard surface 50 of the bond layer, and similarly, the closed pore network 48 of the thermal barrier layer 36 is located toward an outboard surface 52 of the thermal barrier layer. Both the open pore networks 38, 42 and the closed pore networks 46, 48 create a pore space geometry, the architecture of which can be modified by adjusting various parameters during the coating or thermal spraying process, as will be detailed further below.

Example open pore networks, such as the open pore network 42 of the bond layer 32, are illustrated in the enlarged cross-section micrographs of FIGS. 3-8. Again, features of the open pore network 42 discussed below are also applicable to the open pore network 38 of the thermal barrier layer 36 in embodiments where a thermal barrier layer 36 interfaces with the friction pad 22. The open pore network 42 includes a recessed topology 54 having a plurality of craters 56 configured to interlock friction material of the friction pad 44, or in some embodiments, one or more intermediate layers such as the transition layer 34 and/or the thermal barrier layer 36. The craters 56 are generally concave and bowl-shaped, allowing the flow of friction material to fill the pore space of each crater. One or more craters 56 may include a tortuous side wall 58. A tortuous side wall 58 includes two or more separate undercuts 60, each undercut having an area that generally opposes the inboard surface 26 of the reinforcement plate 12, into which friction material can flow to help mechanically interlock the friction pad 22 (only a few of the craters 56, tortuous side walls 58, and/or undercuts may be labeled in the figures for clarity purposes). In embodiments with the thermal barrier layer 36, undercuts 60 in the bond layer 32 may help lock the thermal barrier layer 36 or the transition layer 34. The tortuosity of the open pore network 42 generally defines the sinuosity and interconnectedness of the pore space, and provides areas to mechanically lock the friction material.

The porosity of each layer 32, 34, 36 of the coating 14 is typically controlled to enhance bonding, and the porosity may help reduce the thermal conductivity of the thermal barrier layer 36 in some embodiments. When a thermal spray method is used to apply the coating 14, the porosity of each layer 32, 34, 36 is typically about 25% or less by vol., and preferably 5% by vol. to 25% by vol., based on the total volume of coating 14. The pores of the thermal barrier coating 22 are typically concentrated toward each inboard surface 40, 44 so as to have a greater porosity by volume at the open pore network 38, 42. The porosity helps create a surface roughness Ra of more than 15 micron. Further, the porosity may create craters 56 having tortuous side walls 58 that range in height from about 25 microns to 500 microns.

The composition of the bond layer 32 can be metal, and may have the same composition as the material used to form the reinforcement plate 12, for example a steel powder. Alternatively, the bond layer 32 can comprise a high performance superalloy, such as those used in coatings of jet turbines. According to example embodiments, the bond layer 32 includes or consists of at least one of alloy selected from the group consisting of CoNiCrAlY, NiCrAlY, NiCr, NiAl, NiCrAl, NiAlMo, and NiTi. The bond layer 32 can be provided in the form of particles having a particle size of −325 mesh (less than 44 microns) or finer. Alternatively, coarser bond material powders can be used with particle sizes between 40-200 microns.

In embodiments where a thermal barrier layer 36 is used, the thermal barrier layer may be formed of a ceramic material, specifically at least one oxide, for example ceria, ceria stabilized zirconia, yttria stabilized zirconia, calcia stabilized zirconia, magnesia stabilized zirconia, zirconia stabilized by another oxide, and/or a mixture thereof. The ceramic material may have a low thermal conductivity, such as less than 1 W/mK. When ceria is used in the ceramic material, the thermal barrier layer 36 may be more stable under high temperatures and pressures. Ceria and ceria stabilized zirconia can be much more stable under such thermal and chemical conditions. Ceria has a thermal expansion coefficient which is preferably similar to the steel material used to form the reinforcement plate 12, and in some embodiments, the bond layer 32. The thermal expansion coefficient of ceria at room temperature ranges from 10E-6 to 11E-6, and the thermal expansion coefficient of steel at room temperature ranges from 11E-6 to 14E-6. The similar thermal expansion coefficients can help to avoid thermal mismatches that produce stress cracks.

In one embodiment, the ceramic material used to form the thermal barrier layer 36 includes ceria in an amount of 90 to 100 wt. %, based on the total weight of the ceramic material. In another example embodiment, the ceramic material includes ceria stabilized zirconia in an amount of 90 to 100 wt. %, based on the total weight of the ceramic material. In another example embodiment, the ceramic material includes yttria stabilized zirconia in an amount of 90 to 100 wt. %, based on the total weight of the ceramic material. In yet another example embodiment, the ceramic material includes ceria stabilized zirconia and yttria stabilized zirconia in a total amount of 90 to 100 wt. %, based on the total weight of the ceramic material. In another example embodiment, the ceramic material includes magnesia stabilized zirconia, calcia stabilized zirconia, and/or zirconia stabilized by another oxide in an amount of 90 to 100 wt. %, based on the total weight of the ceramic material. In other words, any of the oxides can be used alone or in combination in an amount of 90 to 100 wt. %, based on the total weight of the ceramic material. In cases where the ceramic material does not consist entirely of the ceria, ceria stabilized zirconia, yttria stabilized zirconia, magnesia stabilized zirconia, calcia stabilized zirconia, and/or zirconia stabilized by another oxide, the remaining portion of the ceramic material typically consists of other oxides and compounds such as aluminum oxide, titanium oxide, chromium oxide, silicon oxide, manganese or cobalt compounds, and/or silicon nitride.

According to one embodiment, wherein the ceramic material includes ceria stabilized zirconia, the ceramic material includes the ceria in an amount of 20 wt. % to 25 wt. % and the zirconia in an amount of 75 wt. % to 80 wt. %, based on the total amount of ceria stabilized zirconia in the ceramic material. Alternatively, the ceramic material can include up to 3 wt. % yttria, and the amount of zirconia can be reduced accordingly. In this embodiment, the ceria stabilized zirconia is provided in the form of particles having a nominal particle size of 11 micron to 125 micron. Preferably, 90 wt. % of the ceria stabilized zirconia particles have a nominal particle size less than 90 micron, 50 wt. % of the ceria stabilized zirconia particles have a nominal particle size less than 50 micron, and 10 wt. % of the ceria stabilized zirconia particles have a nominal particle size less than 25 micron. Alternatively, 90 volume % of the ceria stabilized zirconia particles have a nominal particle size less than 85 micron, 50 volume % of the ceria stabilized zirconia particles have a nominal particle size less than 53 micron, and 10 volume % of the ceria stabilized zirconia particles have a nominal particle size less than 20 micron.

According to another example embodiment, wherein the ceramic material includes yttria stabilized zirconia, the ceramic material may include the yttria in an amount of 7 wt. % to 9 wt. %, and the zirconia in an amount of 91 wt. % to 93 wt. %, based on the amount of yttria stabilized zirconia in the ceramic material. In this embodiment, the yttria stabilized zirconia can be provided in the form of particles having a nominal particle size of 11 micron to 125 micron. Preferably, 90 wt. % of the yttria stabilized zirconia particles have a nominal particle size less than 90 micron, 50 wt. % of the yttria stabilized zirconia particles have a nominal particle size less than 50 micron, and 10 wt. % of the yttria stabilized zirconia particles have a nominal particle size less than 25 micron.

According to another example embodiment, wherein the ceramic material includes a mixture of ceria stabilized zirconia and yttria stabilized zirconia, the ceramic material includes the ceria stabilized zirconia in an amount of 5 wt. % to 95 wt. %, and the yttria stabilized zirconia in an amount of 5 wt. % to 95 wt. %, based on the total amount of the mixture present in the ceramic material. In this embodiment, the ceria stabilized zirconia is provided in the form of particles having a nominal particle size of 11 micron to 125 micron. Preferably, 90 wt. % of the ceria stabilized zirconia particles have a particle size less than 90 micron, 50 wt. % of the ceria stabilized zirconia particles have a particle size less than 50 micron, and 10 wt. % of the ceria stabilized zirconia particles have a particle size less than 25 micron.

The yttria stabilized zirconia can also be provided in the form of particles having a nominal particle size of 11 micron to 125 micron. Preferably, 90 wt. % of the yttria stabilized zirconia particles have a particle size less than 109 micron, 50 wt. % of the yttria stabilized zirconia particles have a particle size less than 59 micron, and 10 wt. % of the yttria stabilized zirconia particles have a particle size less than 28 micron. When the ceramic material includes the mixture of ceria stabilized zirconia and yttria stabilized zirconia, the ceramic material can be formed by adding 5 wt. % to 95 wt. % of ceria stabilized zirconia to the balance of yttria stabilized zirconia in the total 100 wt. % mixture.

According to yet another example embodiment, wherein the ceramic material includes calcia stabilized zirconia, the ceramic material 50 can include the calcia in an amount of 4.5 wt. % to 5.5 wt. %, and the zirconia in an amount of 91.5 wt. %, with the balance consisting of other oxides in the ceramic material. In this embodiment, the calcia stabilized zirconia is provided in the form of particles having a nominal particle size range of 11 micron to 90 micron. Preferably, the calcia stabilized zirconia particles contain a maximum of 7 wt. % with particle size greater than 45 micron and up to 65 wt. % of particles less than 45 micron.

According to yet another example embodiment, wherein the ceramic material includes magnesia stabilized zirconia, the ceramic material can include the magnesia in an amount of 15 wt. % to 30 wt. %, with the balance consisting of zirconia. In this embodiment, the magnesia stabilized zirconia is provided in the form of particles having a nominal particle size of 11 micron to 90 micron. Preferably, 15 wt. % of the magnesia stabilized zirconia particles have a particle size less than 88 micron.

Other oxides or mixtures of oxides may be used to stabilize the ceramic material. The amount of other oxide or mixed oxides is typically in the range 5 wt. % to 38 wt. % and the nominal particle size range of the stabilized ceramic material is 1 micron to 125 micron.

The coating 14 may also be applied in a gradient structure 62 with the transition layer 34 to help avoid discrete metal/ceramic interfaces. With the transition layer 34 creating the gradient structure, the coating 14, and accordingly the friction pad 22, may be less likely to de-bond during service. The gradient structure 62 of the coating 14 may be formed by first applying the bond layer 32, followed by a mixture of the metal bond material and ceramic material at the transition layer 34, and then the ceramic material of the thermal barrier layer 36.

The gradient structure 62 can be formed by gradually transitioning from 100% metal bond material to 100% ceramic material. The coating 14 includes the metal bond material of the bond layer 32 applied to the reinforcement plate 12, followed by increasing amounts of the ceramic material and reduced amounts of the metal bond material. The transition function of the gradient structure 62 can be linear, exponential, parabolic, Gaussian, binomial, or could follow another equation relating composition average to position.

In some embodiments, the uppermost portion of the coating 14 is formed entirely of the ceramic material. The gradient structure 62 can help to mitigate stress build up through thermal mismatches and can reduce the tendency of forming a continuous weak oxide boundary layer at the interface of the ceramic material and the metal bond material of the thermal barrier layer 36 and bond layer 32, respectively.

According to one embodiment, the lowermost portion of the coating 14 applied directly to the inboard surface 26 of the reinforcement plate 12, consists of metal bond material of the bond layer 32. In some embodiments, the uppermost portion of the coating 14 can consist of the ceramic material of the thermal barrier layer 36. The gradient structure 62 of the coating 14 which continuously transitions from the 100% metal bond material to the 100% ceramic material is located therebetween. Typically, 30% to 90% of the entire thickness of the coating 14 is formed of, or consists of, the gradient structure 62. It is also possible that 10% to 90% of the entire thickness of the coating 14 is formed of the bond layer 32, up to 80% of the thickness of the coating 14 is formed of the gradient structure 62, and 10% to 90% of the entire thickness of the coating is formed of the ceramic material for the thermal barrier layer 36.

The bond strength of the coating 14 may also be increased due to the gradient structure 62 present in the coating 14 and the composition of the metal used to form the backing plate 10. The bond strength of the coating 14 having a thickness of 0.38 mm is typically at least 2000 psi when tested according to ASTM C633.

The thermal barrier layer 36 has a low thermal conductivity to reduce heat flow through the coating 14. Typically, in embodiments with a thermal barrier layer 36, the thermal conductivity of the coating 14 having a thickness of less than 1 mm, is less than 1.00 W/mK, preferably less than 0.5 W/mK, and most preferably not greater than 0.23 W/mK. The specific heat capacity of the coating 14 depends on the specific compositions used, but typically ranges from 480 J/kgK to 610 J/kgK at temperatures between 40 and 700° C. The low thermal conductivity of the coating 14 may be achieved by the relatively high porosity of the thermal barrier layer 36. Due to the composition and low thermal conductivity of the thermal barrier layer 36, the thickness of the coating 14 can be reduced, which can reduce the risk of cracks, while achieving the same level of insulation relative to comparative coatings of greater thickness. It is noted that the advantageous low thermal conductivity of the thermal barrier layer 36 is not expected. When the ceramic material of the thermal barrier layer 36 includes ceria stabilized zirconia, the thermal conductivity is especially low.

A coating 14 with the gradient structure 62 can be compared to a coating having a two-layer structure, which may be less successful than the coating 14 with the gradient structure 62. The comparative coating includes a metal bond layer applied to a metal backing plate followed by a ceramic layer with discrete interfaces through the coating. In this case, the porous ceramic layer and can begin to oxidize the bond layer at the ceramic/bond layer interface. The oxidation may cause a weak boundary layer to form, which harms the performance of the coating. However, the coating with the gradient structure 62 can provide numerous advantages. The coating 14 is applied to at least a portion of the surface of the reinforcement plate 12 to provide a reduction in heat flow through the friction pad 22 to other components of the braking system. The reduction in heat flow is typically at least 50%, relative to the same component without the coating 14.

Figure 9:
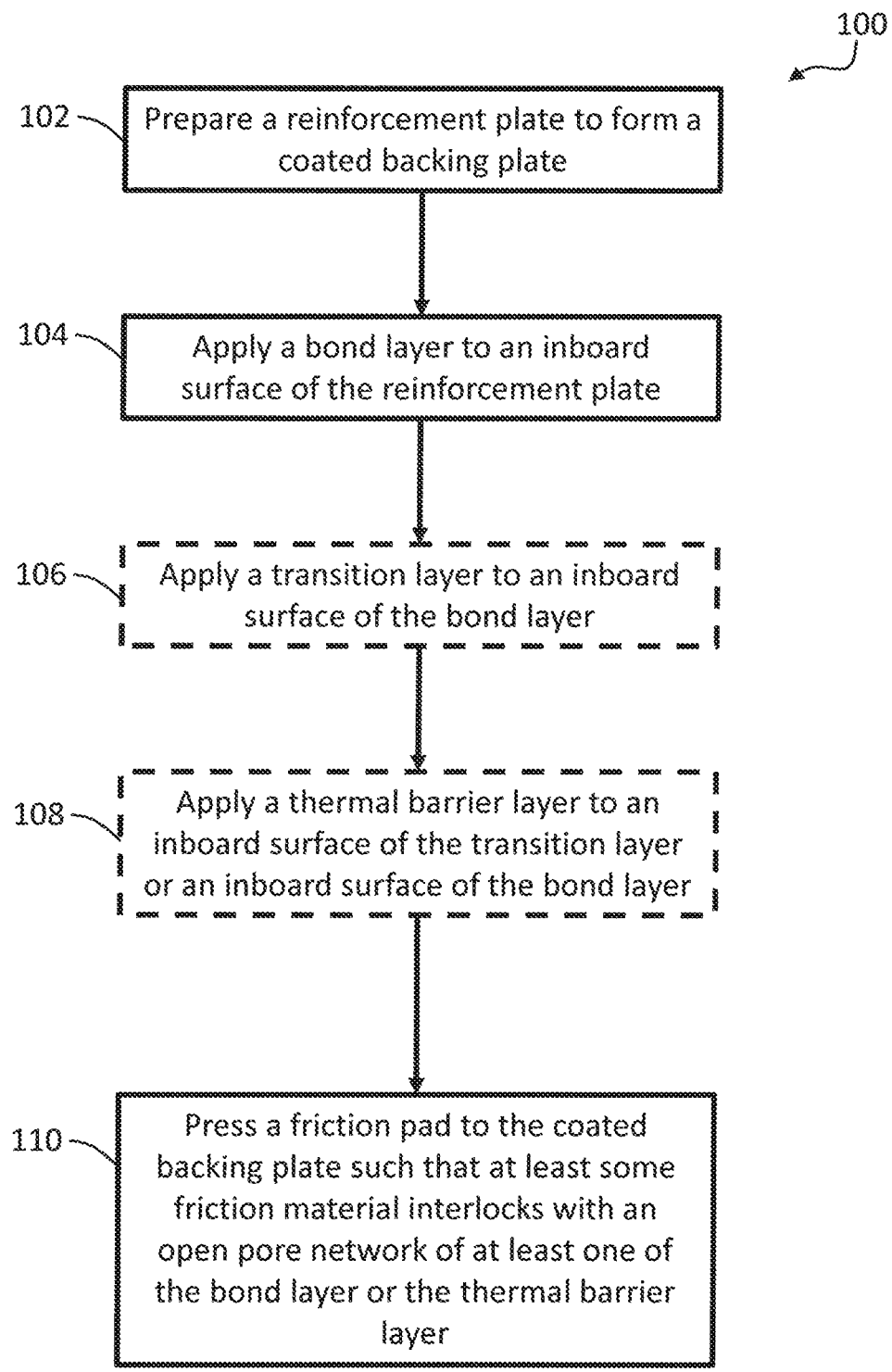
FIG. 9 is a flowchart illustrating example steps of a method of manufacturing a brake pad.

FIG. 9 is a flowchart illustrating example steps of a method 100 of manufacturing the complete brake pad 20 with its coated backing plate 10. It should be noted, however, that the brake pad and coated backing plate may be formed in accordance with other methods than those described below. Further, the steps below may be altered or adjusted depending on the desired implementation for the coated backing plate 10. Additionally, while the method 100 below is described in conjunction with the coated backing plate 10 illustrated FIG. 2 (i.e., having a transition layer 34 and a thermal barrier layer 36), it is possible that other backing plate embodiments may be formed using the described methodology (e.g., backing plates 10 having only the bond layer 32 as shown in FIGS. 1 and 3-8, or more layers than illustrated).

Step 102 involves preparing the reinforcement plate 12. The reinforcement plate 12, which is typically formed of steel, can be manufactured according to various different methods, such as stamping, forging, casting, etc. Cleaning the reinforcement plate 12 can help with adherence of the coating 14. In one embodiment, the reinforcement plate 12 is grit blasted on the inboard surface 26 to remove contamination, oxides, grease, etc. A subsequent optional solvent wash (e.g., with acetone or isopropyl alcohol) and/or air blast can be performed if necessary. As shown in FIG. 1, the ears 64 of the reinforcement plate 12 do not have the coating 14. It may be desirable to mask certain areas, such as those which interact with the caliper, so they are not coated in later steps of the method. In other embodiments, a mask may be applied around the entire outer perimeter 28 such that the coating 14 is only located where the friction pad 22 is to be applied. In yet other embodiments, there may be no mask and the entire reinforcement plate 12 could be coated. Where a mask is used, a silicone masking tape or a fit-over metal mask may be use to avoid deposits in non-bonded edge regions. The mask is then removed after coating.

In step 104, the coated backing plate 10 is formed by applying the bond layer 32 to the inboard surface 26 of the reinforcement plate 12. The bond layer 32 may be provided in the form of particles or powders. The particles can be hollow spheres, spray dried, spray dried and sintered, sol-gel, fused, and/or crushed. In an example embodiment, the method 100 includes applying the bond layer 32 by a thermal or kinetic method. According to one embodiment, a thermal spray technique, such as plasma spraying, flame spraying, or twin wire arc deposition, is used to form the bond layer 32. High velocity oxy-fuel (HVOF) spraying is a preferred example of a kinetic method that gives a denser coating. Other methods of applying the bond layer 32 to the reinforcement plate 12 can also be used. For example, the layer 32 could be applied by a vacuum method, such as physical vapor deposition or chemical vapor deposition. The pore space geometry of the closed pore network 46 and/or the open pore network 42 can be influenced by the adjustment of various process parameters, such as the powder feed rate, the gun flow rate, stand-off distance, input power or current, etc. For example, a low velocity arc spray plume can generate larger metal droplets, which can collide while in flight to the inboard surface 26 and form a rougher, more porous surface. Further, the coating method may depend on the various materials used for the bond layer 32. For example, with wire arc (with wires typically ranging from 1 to 3 mm diameter), the material for bond layer 32 may be steel, nickel, or a nickel chromium alloy. The deposition rate for wire arc may be about 15 kg per hour. With plasma spray, other materials, including those compatible with wire arc, may be used, along with nickel or cobalt based superalloys used in aerospace coatings. The deposition rate for plasma spray may be as high as 5 kg per hour, more typically the deposition rate is 1-3 kg per hour.

Steps 106 and 108 may be used in some embodiments, and involve applying a transition layer 34 or a thermal barrier layer 36 over the exposed inboard side of the bond layer 32. In some embodiments, these steps may involve the creation of a gradient structure 62. The same methods of applying the bond layer 32 may be used to apply the transition layer 34 and/or the thermal barrier layer 38. According to one embodiment, HVOF is used to apply the bond layer 32, and a thermal spray technique, such as plasma spray, is used to apply the gradient structure 62 and the thermal barrier layer 36 of ceramic material. Also, the gradient structure 62 can be applied by changing feed rates of twin powder feeders while the plasma sprayed coating 14 is being applied.

In one example, step 104 begins by spraying metal bond material in an amount of 100 wt. % and ceramic material in an amount of 0 wt. %, based on the total weight of the materials being sprayed. Throughout the spraying process, an increasing amount of ceramic material can be added to the composition (step 106), while the amount of metal bond material is reduced. Thus, the composition of the coating 14 can gradually change from 100% metal bond material along the inboard surface 26 of the reinforcement plate 12 to 100% ceramic material at an inboard surface 40 of the thermal barrier layer 36 (step 108). Multiple powder feeders are typically used to apply the coating 14, and their feed rates can be adjusted to achieve the gradient structure 62. The gradient structure 62 of the coating 14 can thus be achieved during the thermal spray process. In one example, the total thickness of the applied coating 14, having a bond layer 32, a transition layer 34, and a thermal barrier layer 36, is about 100 micron to 2.5 mm. In addition, there could be more layers to the coating 14 than what is illustrated. To cite one example, an additional layer of the metal bonding material can be applied over the ceramic material of the thermal barrier layer 36 such that another bond layer 32 interfaces with the outboard facing attachment surface 24 of the friction pad 22.

Step 110 involves pressing the friction pad 22 to the coated backing plate 10 such that at least some friction material interlocks with the open pore network 38, 42 of at least one of the bond layer 32 or the thermal barrier layer 36. Typically, at this stage, the friction pad 22 is in a preform or puck stage that is not fully cured. The friction pad 22 is press cured or press formed (sometimes with increased temperature) to adhere with the open pore network 38, 42. Accordingly, at least some friction material fills the craters 56 and can flow beneath undercuts 60 to help promote attachment between the backing plate 10 and the friction pad 22.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A coated backing plate for a brake pad, comprising:
   a reinforcement plate having an outboard surface and an inboard surface; and
   a thermal barrier coating comprising a bond layer, a transition layer, and a thermal barrier layer, the bond layer having a closed pore network toward an outboard surface of the bond layer that faces the inboard surface of the reinforcement plate, and the thermal barrier coating having an open pore network at an inboard surface of the thermal barrier layer, wherein the open pore network includes a recessed topology having a plurality of craters configured to interlock a friction material of a friction pad, and wherein the bond layer, the transition layer, and the thermal barrier layer each have a different material composition.

2. The coated backing plate of claim 1, wherein the open pore network and the closed pore network create a pore space geometry having an architecture, wherein the architecture of the pore space geometry is influenced by a parameter in a thermal spray process.

3. The coated backing plate of claim 2, wherein a tortuosity of the open pore network defines a sinuosity and an interconnectedness of the pore space geometry.

4. The coated backing plate of claim 1, wherein one or more craters of the plurality of craters includes a tortuous side wall.

5. The coated backing plate of claim 4, wherein the tortuous side wall includes two or more separate undercuts, each undercut having an area that generally opposes the inboard surface of the reinforcement plate.

6. The coated backing plate of claim 1, wherein the bond layer includes hollow sphere particles, spray dried particles, sintered particles, sol-gel particles, fused particles, crushed particles, or a combination of hollow sphere particles, spray dried particles, sintered particles, sol-gel particles, fused particles, and/or crushed particles.

7. The coated backing plate of claim 1, wherein the thermal barrier coating has a porosity by volume between 5% and 25%, inclusive.

8. The coated backing plate of claim 1, wherein the transition layer and the thermal barrier layer include a ceramic material with a thermal conductivity that is less than 1 W/mk.

9. The coated backing plate of claim 1, wherein the thermal barrier coating has a gradient structure that transitions from 100% of a metal bond material for the bond layer to 100% of a ceramic material for the thermal barrier layer.

10. The coated backing plate of claim 9, wherein 10% to 90%, inclusive, of a thickness of the thermal barrier coating is formed of the bond layer, up to 80% of the thickness of the thermal barrier coating is formed of the gradient structure, and 10% to 90%, inclusive, of the thickness of the thermal barrier coating is formed of the thermal barrier layer.

11. A brake pad, comprising:
    the coated backing plate of claim 1; and
    a friction pad of a friction material, wherein the friction material is interlocked with the open pore network.

12. A coated backing plate for a brake pad, comprising:
    a reinforcement plate having an outboard surface and an inboard surface; and
    a bond layer having an inboard surface and an outboard surface, wherein the outboard surface of the bond layer faces the inboard surface of the reinforcement plate, wherein the inboard surface of the bond layer includes a plurality of craters configured to interlock friction material of a friction pad or one or more intermediate layers, wherein one or more craters of the plurality of craters includes a tortuous side wall, wherein the tortuous side wall includes two or more separate undercuts, each undercut having an area that generally opposes the inboard surface of the reinforcement plat; and wherein a material for the bond layer and a material for the reinforcement plate are separate materials.

13. A brake pad, comprising:
    the coated backing plate of claim 12; and
    a friction pad of a friction material, wherein the friction material is interlocked with the plurality of craters at the inboard surface of the bond layer, or the friction material is interlocked with a plurality of craters at an inboard surface of an intermediate layer of the one or more intermediate layers.

14. A method of manufacturing a brake pad, comprising the steps of:
    preparing a reinforcement plate, the reinforcement plate having an inboard surface and an outboard surface;
    spraying a bond layer material to the inboard surface of the reinforcement plate;
    adjusting a velocity of a spray plume to generate larger metal droplets to collide while in flight to the inboard surface of the reinforcement plate and forming a coated backing plate; and
    pressing a friction pad to the coated backing plate such that a friction material of the friction pad interlocks with an open pore network of the coated backing plate.

15. The method of claim 14, wherein the open pore network includes a recessed topology having a plurality of craters configured to interlock the friction material of the friction pad.

16. The method of claim 14, wherein the bond layer is sprayed by high velocity oxy-fuel (HVOF) spraying.

17. The method of claim 16, further comprising the step of plasma spraying a gradient structure and a thermal barrier layer on the bond layer.

* * * * *